US012587849B2

(12) United States Patent
Nelson et al.

(10) Patent No.: US 12,587,849 B2
(45) Date of Patent: Mar. 24, 2026

(54) SYSTEM AND METHOD FOR USING RADIO NOISE TO ASSURE USER PRESENCE WITH DEVICE BEING ACCESSED

(71) Applicant: Dell Products L.P., Round Rock, TX (US)

(72) Inventors: Amy C. Nelson, Round Rock, TX (US); Eric Sendelbach, Austin, TX (US); Derric Hobbs, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/464,538

(22) Filed: Sep. 11, 2023

(65) Prior Publication Data

US 2025/0088848 A1      Mar. 13, 2025

(51) Int. Cl.
| | |
|---|---|
| *H04W 12/37* | (2021.01) |
| *H04W 12/062* | (2021.01) |
| *H04W 24/08* | (2009.01) |

(52) U.S. Cl.
CPC ......... *H04W 12/062* (2021.01); *H04W 12/37* (2021.01); *H04W 24/08* (2013.01)

(58) Field of Classification Search
None
See application file for complete search history.

(56) References Cited

U.S. PATENT DOCUMENTS

| | | | | |
|---|---|---|---|---|
| 11,184,766 B1* | 11/2021 | Lord | ...................... | G06V 10/75 |
| 11,611,550 B1* | 3/2023 | Chavez | ............... | H04L 63/1433 |
| 2022/0146482 A1* | 5/2022 | Fuerst | ................... | G06N 20/00 |
| 2023/0164187 A1* | 5/2023 | duPont | .................. | H04W 12/06 |
| | | | | 726/4 |
| 2023/0260552 A1* | 8/2023 | Bose | ...................... | H04N 5/765 |
| | | | | 463/31 |

* cited by examiner

*Primary Examiner* — Trang T Doan
(74) *Attorney, Agent, or Firm* — McDermott Will & Schulte LLP

(57) ABSTRACT

A method for assuring a person wanting to access an information handling system is an authorized user comprises the information handling system comparing radio noise detected near the information handling system with radio noise detected near a mobile device associated with the authorized user. If the radio noise information matches, the person wanting to use the information handling system may be determined to be the authorized user. If the radio noise does not match, the information handling system may remain locked until the person can be verified as the authorized user.

14 Claims, 3 Drawing Sheets

SYSTEM AND METHOD FOR USING RADIO NOISE TO ASSURE USER PRESENCE WITH DEVICE BEING ACCESSED

BACKGROUND

Field of the Disclosure

This disclosure relates generally to information handling systems and, more particularly, to systems and methods for using radio noise to assure user presence relative to a device being accessed.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be directed to a method for verifying co-location of an information handling system with a mobile device. The method may comprise receiving, by an information handling system, a set of user credentials from a person; collecting, by an information handling system, radio noise information associated with one or more radio noise sources in a first environment in which the information handling system is located; identifying, by the information handling system, a mobile device associated with an authorized user of the information handling system; collecting, by the mobile device, radio noise information associated with one or more radio noise sources in a second environment in which the mobile device is located; determining the radio noise information associated with the one or more radio noise sources in the first environment matches the radio noise information associated with the one or more radio noise sources in the second environment; and determining the information handling system and the mobile device are co-located.

In some embodiments, determining the radio noise information associated with the one or more radio noise sources in the first environment matches the radio noise information associated with the one or more radio noise sources in the second environment comprises determining a number of radio noise sources associated with the first environment matches a number of radio noise sources associated with the second environment. In some embodiments, determining the number of radio noise sources associated with the first environment matches the number of radio noise sources associated with the second environment comprises determining a number of radio noise sources associated with the first environment communicating according to a cellular frequency matches a number of radio noise sources associated with the second environment communicating according to the cellular frequency. In some embodiments, determining the number of radio noise sources associated with the first environment matches the number of radio noise sources associated with the second environment comprises determining a number of radio noise sources associated with the first environment communicating according to a Wi-Fi frequency matches a number of radio noise sources associated with the second environment communicating according to the Wi-Fi frequency. In some embodiments, determining the number of radio noise sources associated with the first environment matches the number of radio noise sources associated with the second environment comprises determining a number of radio noise sources associated with the first environment communicating according to a Bluetooth frequency matches a number of radio noise sources associated with the second environment communicating according to the Bluetooth frequency. In some embodiments, determining the radio noise information associated with the first environment matches the radio noise information associated with the second environment comprises determining a signal strength associated with a radio noise source of the one or more radio noise sources in the first environment matches a signal strength associated with a radio noise source of the one or more radio noise sources in the second environment.

In some embodiments, the method further comprises generating, by each of the information handling system and the mobile device, a pulse pattern based on the radio noise information; emitting, by the mobile device, the pulse pattern; detecting, by the information handling system, the pulse pattern; and determining if the pulse pattern received from the mobile device matches the pulse pattern generated by the information handling system. In some embodiments, if the pulse pattern received from the mobile device matches the pulse pattern generated by the information handling system, allowing the authorized user to continue accessing the information handling system. In some embodiments, if the pulse pattern received from the mobile device does not match the pulse pattern generated by the information handling system, determining the mobile device is not co-located with the information handling system; and preventing access to the information handling system.

Embodiments may be directed to a method for verifying a person attempting to access an information handling system is an authorized user. The method may comprise storing, in memory in the information handling system, a set of user credentials for an authorized user; executing, by the information handling system, an application stored in the memory for collecting radio noise information associated with one or more radio noise sources in a first environment in which the information handling system is located; identifying a mobile device associated with the authorized user; executing, by the mobile device associated with the authorized user, an application stored in memory in the mobile device for collecting radio noise information associated with one or more radio noise sources in a second environment in which the mobile device is located; determining if the radio noise information associated with the first environment matches the radio noise information collected from the second environment. If the radio noise information associated with the first environment matches the radio noise information associated with the second environment, the method may comprise determining the person attempting to access the information handling system is the authorized user; and allowing the authorized user to access the information handling system. If the radio noise information associated with the first environment does not match the radio noise information associated with the second environment, the method may comprise performing one or more of: locking the information handling system; and notifying the person that one or more additional steps must be completed to access the information handling system.

In some embodiments, determining if the radio noise information associated with the one or more radio noise sources in the first environment matches the radio noise information associated with the one or more radio noise sources in the second environment comprises determining if a number of radio noise sources associated with the first environment matches a number of radio noise sources associated with the second environment. In some embodiments, determining if the number of radio noise sources associated with the first environment matches the number of radio noise sources associated with the second environment comprises determining if a number of radio noise sources associated with the first environment communicating according to a cellular frequency matches a number of radio noise sources associated with the second environment communicating according to the cellular frequency. In some embodiments, determining the number of radio noise sources associated with the first environment matches the number of radio noise sources associated with the second environment comprises determining a number of radio noise sources associated with the first environment communicating according to a Wi-Fi frequency matches a number of radio noise sources associated with the second environment communicating according to the Wi-Fi frequency. In some embodiments, determining the number of radio noise sources associated with the first environment matches the number of radio noise sources associated with the second environment comprises determining a number of radio noise sources associated with the first environment communicating according to a Bluetooth frequency matches a number of radio noise sources associated with the second environment communicating according to the Bluetooth frequency. In some embodiments, determining the radio noise information associated with the first environment matches the radio noise information associated with the second environment comprises determining a signal strength associated with a radio noise source of the one or more radio noise sources in the first environment matches a signal strength associated with a radio noise source of the one or more radio noise sources in the second environment.

In some embodiments, the method further comprises generating, by each of the information handling system and the mobile device, a pulse pattern based on the radio noise information; transmitting, by the mobile device, a keyset based on the pulse pattern; detecting, by the information handling system, the keyset; and determining if the keyset received from the mobile device matches the pulse pattern generated by the information handling system. If the keyset received from the mobile device matches the pulse pattern generated by the information handling system, the method may comprise allowing the authorized user to continue accessing the information handling system. If the keyset received from the mobile device does not match the pulse pattern generated by the information handling system, the method may comprise determining the mobile device is not co-located with the information handling system; and preventing access to the information handling system.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
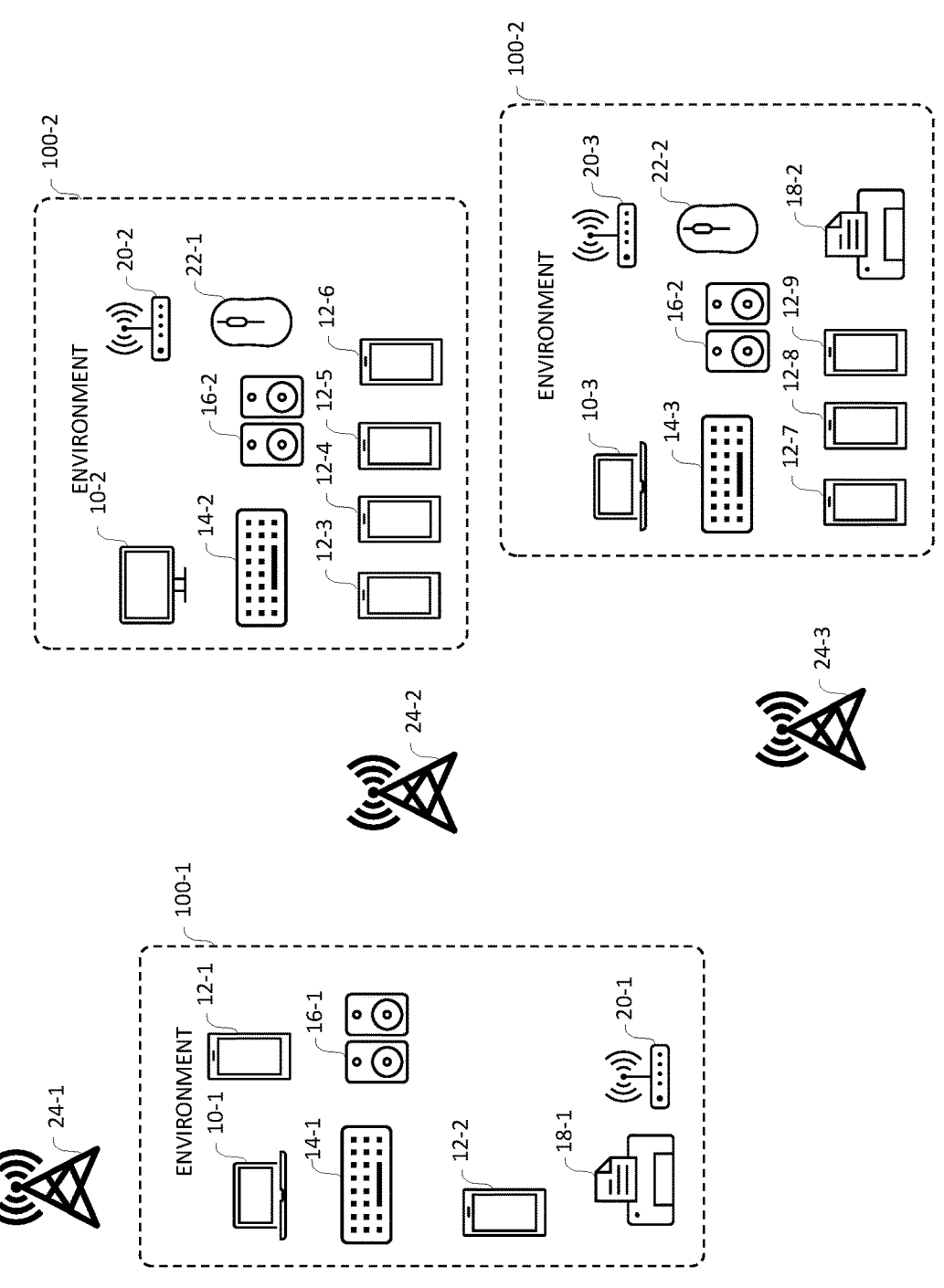
FIG. 1 is a representation of multiple environments, each environment having unique devices associated with each device associated with a frequency.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective or generic element. Thus, for example, pin "124" refers to an instance of a pin, which may be referred to collectively as pins "124" and any one of which may be referred to generically as pin "124."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic handheld device, a network storage handheld device, or another suitable handheld device and may vary in size, shape, performance, functionality, and price. The information handling system may include memory, one or more processing resources such as a central processing unit (CPU) or hardware or software control logic. Additional components of the information handling system may include one or more storage handheld devices, one or more communications ports for communicating with external handheld devices as well as various input and output (I/O) handheld devices, such as a keyboard, a mouse, and one or more video displays. The information handling system may also include one or more buses operable to transmit communication between the various hardware components.

Information handling system security, particularly verifying a user has access rights to the information handling system, is becoming increasingly complex as remote access vectors become more widespread and sophisticated. All verification schemes have vulnerabilities in terms of security. For example, one security scheme is the use of a username and password. However, social engineering techniques (e.g., phishing) make it possible for bad actors to access information handling systems 10 remotely. Another security scheme is two factor authentication. Man-in-themiddle attacks (e.g., cyberattacks in which the attacker secretly relays and possibly alters the communications between two parties who believe that they are directly communicating with each other) also allow for remote access. Smartcard or keycard security schemes, fingerprint scanners, and cameras require additional hardware and are not available on all information handling systems 10. Wired connections are not always available and result in a loss of mobility.

Many verification schemes require additional hardware to be added to information handling systems, or alternate hardware to be deployed (e.g., keycards, IR scanners, fingerprint scanners), which add cost and complexity to information handling systems.

Embodiments disclosed herein may compliment current security verification and add an additional line of defense in cases where the security is higher or alternate modes are not present. Embodiments may add an additional layer of security by assuring a physical presence match between the user and the computer based on environmental factors to match location. This can be done with transparent user impact and minimal additional interaction.

Radio Noise

Information handling systems may communicate wirelessly with other information handling systems and devices. Communication may occur over various frequencies. For example, cellular communications in the United States generally occur in one of four major radio frequency bands: 698-806 MHz (700 MHz band); 806-849/851-896 MHz (800 MHz band); 1850-1910/1930-1990 MHz (PCS band) and 1710-1755/2110-2155 MHz (AWS band). Bluetooth is a short-range wireless technology that uses UHF radio waves in the ISM bands (e.g., from 2.402 GHz to 2.48 GHz and 5.15 GHz to 5.35 GHz and 5.725 GHz to 5.85 GHz). WAN communications may be in one or more other frequency ranges. Within an environment (which may be a physical structure or an area), radio communications by multiple sources may result in radio noise.

Radio Noise Varies in Different Environments

Due to the variability in what radio sources transmit radio signals in an environment, an environment may be distinguishable from other environments by identifying and comparing the frequencies present in each environment.

Embodiments disclosed herein may use existing hardware to detect radio signals from various sources (e.g., cellular or unsecured environment, such as found in an airport, a coffee shop, and other public places and businesses.

Within environment 100-1, radio noise may be present due to a plurality of radio noise sources, each radio noise source emitting signals at a unique frequency or within a range of frequencies. For example, laptop 10-1, mobile phones 12-1 and 12-2, wireless keyboard 14-1, sound system 16-1, printer 18-1 and Wi-Fi system 20-1 may be physically located within and emit radio signals in environment 100-1. Communications towers 24-1 and 24-2 may not be within a physical location corresponding to environment 100-1 but radio communications may be sent and received from mobile phones 12 such that communications towers 24-1 and 24-2 may also be associated with environment 100-1. Referring to environment 100-2, desktop computer 10-2, mobile phones 12-3, 12-4, 12-5 and 12-6, wireless keyboard 14-2, Wi-Fi system 20-3, wireless mouse 22-1 may be physically located within environment 100-2 and communications tower 24-2 may be nearby and associated with environment 100-2. Referring to environment 100-3, laptop 10-3, mobile phones 12-7, 12-8 and 12-9, wireless keyboard 14-3, sound system 16-2, printer 18-2. Wi-Fi system 20-4 and wireless mouse 22-2 may be physically located within a physical structure corresponding to environment 100-3, and communications towers 24-2 and 24-3 may also be associated with environment 100-3.

Mobile phones 12 may already utilize one or more security systems (e.g., face recognition, fingerprint recognition, PINs) that are already synchronized to their users. Furthermore, users commonly have their mobile phone 12 with them at all times.

Embodiments may utilize existing communications hardware (e.g., in the form of radio communication technologies present in most modern information handling systems 10, as well as the radio communication hardware available in modern mobile phones 12, (e.g., Wi-Fi, Bluetooth, Wireless Area Network (WAN)) to verify user presence near information handling system 10.

Referring to FIG. 1 and Table 1, environment 100-1 may include a plurality of radio noise sources, each radio noise source emitting radio signals. Notably, embodiments described herein may not need to know the contents or other details of a communication, only that the radio signals are present.

TABLE 1

| SOURCE | SIGNAL TYPE/[Frequency] | SIGNAL STRENGTH |
|---|---|---|
| Laptop 10-1 | Bluetooth [5 GHz] | Strong |
| Mobile phone 12-1 | Cellular (e.g., used for a phone call) [PCS band] | Strong |
| Mobile phone 12-2 | Wi-Fi (e.g., used as mobile hot spot) [2.4 GHz] | Strong |
| Wireless keyboard 14-1 | Bluetooth [2.4 GHz] | Weak |
| Wireless speakers 16-1 | Bluetooth (part of a sound system) [2.4 GHz] | Medium |
| Printer 18-1 | Wi-Fi (connected to base Wi-Fi system) [5 GHz] | Weak |
| Wi-Fi 20-1 | Wi-Fi (provides base Wi-Fi throughout area) [2.4 GHz and 5 GHz] | Strong |
| Cell tower 24-1 | Cellular [All bands] | Strong |
| Cell tower 24-2 | Cellular [All bands] | Weak | towers, mobile devices, information handling systems, peripheral devices) to distinguish an environment from other environments. Embodiments may further identify an environment associated with an authorized user of an information handling system as a way to verify user presence.

Turning to FIG. 1, a user may want to access laptop 10-1 in environment 100-1. Environment 100-1 may be a remote Table 1 depicts example sources of radio noise that may be present in environment 100-1, with what signal type each source may use for communication and a signal strength. Notably, mobile phones 12-1 and 12-2 may be emitting radio communications using different signal types and cellular towers 24-1 and 24-2 may have different signal strengths.

TABLE 2

| SOURCE | SIGNAL TYPE | SIGNAL STRENGTH |
| --- | --- | --- |
| Desktop 10-2 | Bluetooth [2.4 GHz] | Strong |
| Mobile phone 12-3 | Cellular (e.g., used for a phone call) [700 MHz] | Strong |
| Mobile phone 12-4 | Wi-Fi (e.g., used as mobile hot spot) [2.4 GHz] | Strong |
| Mobile phone 12-5 | Cellular (e.g., used for a phone call) [PCS band] | Strong |
| Mobile phone 12-6 | Cellular (e.g., used for a phone call) [PCS band] | Strong |
| Wireless keyboard 14-2 | Bluetooth [2.4 GHz] | Weak |
| Wireless speakers 16-2 | Bluetooth (part of a sound system) [2.4 GHz] | Medium |
| Wi-Fi 20-2 | Wi-Fi (provides base Wi-Fi throughout area) [2.4 GHz and 5 GHz] | Strong |
| Wireless mouse 22-1 | Bluetooth [2.4 GHz] | Weak |
| Cell tower 24-2 | Cellular [All bands] | Strong |

Table 2 depicts example devices that may be emitting communications at various frequencies in environment 100-2, with what signal type they may use for communication and a signal strength. Mobile phones 12-3, 12-5 and 12-6 may be emitting cellular communications using different frequencies.

TABLE 3

| SOURCE | SIGNAL TYPE | SIGNAL STRENGTH |
| --- | --- | --- |
| Laptop 10-3 | Bluetooth [5 GHz] | Strong |
| Mobile phone 12-7 | Cellular (e.g., used for a phone call) [PCS band] | Strong |
| Mobile phone 12-8 | Cellular (e.g., used for a phone call) [PCS band] | Strong |
| Mobile phone 12-9 | Cellular (e.g., used for a phone call) [PCS band] | Strong |
| Wireless keyboard 14-3 | Bluetooth [2.4 GHz] | Weak |
| Wireless speakers 16-3 | Bluetooth (part of a sound system) [2.4 GHz] | Medium |
| Printer 18-1 | Wi-Fi [2.4 GHz] | Weak |
| Wi-Fi 20-3 | Wi-Fi (provides base Wi-Fi throughout area) [2.4 GHz and 5 GHz] | Strong |
| Wireless mouse 22-2 | Bluetooth [2.4 GHz] | Weak |
| Cell tower 24-2 | Cellular [All bands] | Weak |
| Cell tower 24-3 | Cellular [All bands] | Strong |

Table 3 depicts example radio noise sources that may be emitting communications at various frequencies in environment 100-3, with what signal type they may use for communication and a signal strength.

Verification Method

Figure 2:
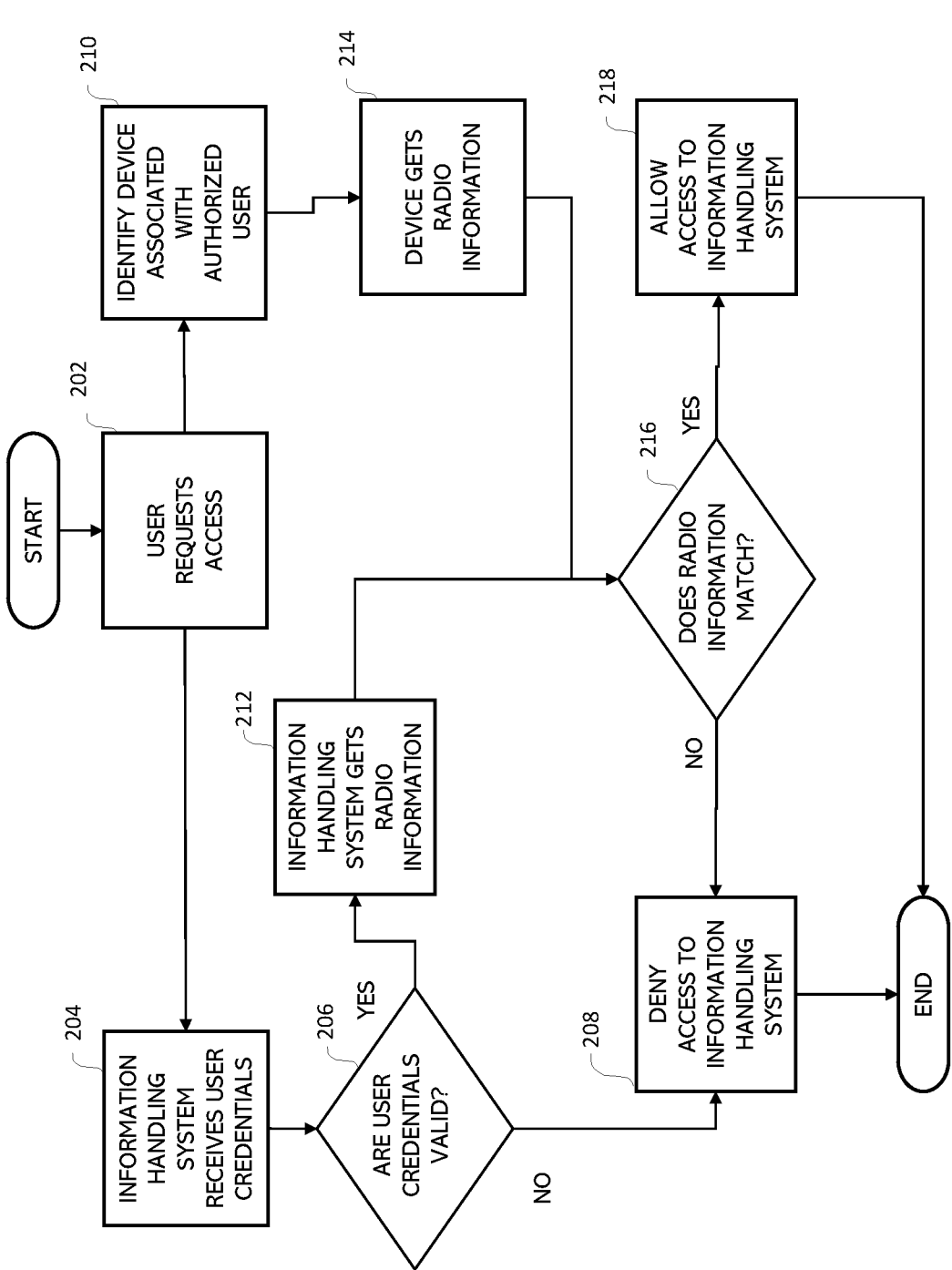
FIG. 2 is a flow diagram illustrating a method for using radio noise to verify that a device associated with a user is in an environment corresponding to the user.

Turning to FIG. 2, a method for verifying a person is an authorized user may begin at step 202 when a person requests access to information handling system 10.

At step 204, information handling system 10 may receive user credentials (e.g., a username and a password or personal identification number (PIN)).

At step 206, information handling system 10 may determine if the user credentials match the user credentials for an authorized user.

If information handling system 10 determines the user credentials provided to information handling system 10-1 do not match the user credentials for an authorized user, then at step 208, information handling system 10 may deny access to information handling system 10.

Referring back to step 202, when a person requests access, information handling system 10 may also, at step 210, collect radio noise information associated with an environment 100 in which information handling system 10 is located. Collecting radio noise information may comprise one or more of identifying a radio noise source, identifying a communications type and determining a signal strength.

Collecting information about radio noise may also comprise one or more of determining a signal direction and determining a signal proximity.

At step 212, information handling system 10 may identify a mobile device 12 associated with an authorized user corresponding to the user credentials.

At step 214, mobile device 12 may collect radio noise information associated with an environment 100 in which mobile device 12 associated with an authorized user is located.

At step 216, information handling system 10 may determine if the radio noise information collected by IHS 10 matches the radio noise information collected by mobile device 12.

At step 218, if information handling system 10 determines the radio noise information collected by IHS 10 matches the radio noise information collected by mobile device 12, information handling system 10 may determine the person requesting access is an authorized user and allow the authorized user to access information handling system 10.

At step 218, if information handling system 10 determines the radio noise information collected by IHS 10 does not match the radio noise information collected by mobile device 12, information handling system 10 may deny access to information handling system 10 by the person. In some embodiments, the person may be allowed to try to verify they are an authorized user to access information handling system 10 using some other process.

Synchronization Method

Embodiments may synchronize mobile phone 12 with information handling system 10 to continuously ensure a person accessing information handling system 10 is still an authorized user. Mobile phone 12 may have memory storing an application that continually synchronizes with an application on information handling system 10 in terms of the frequency, the number of frequencies, signal strengths, and noise patterns that are present.

Both applications scan for other identifiable radio noise (ex: Wi-Fi access points, other devices, etc.), and the applications may synchronize, via small, localized pulses of additional noise (keyed to a synchronized pattern).

Figure 3:
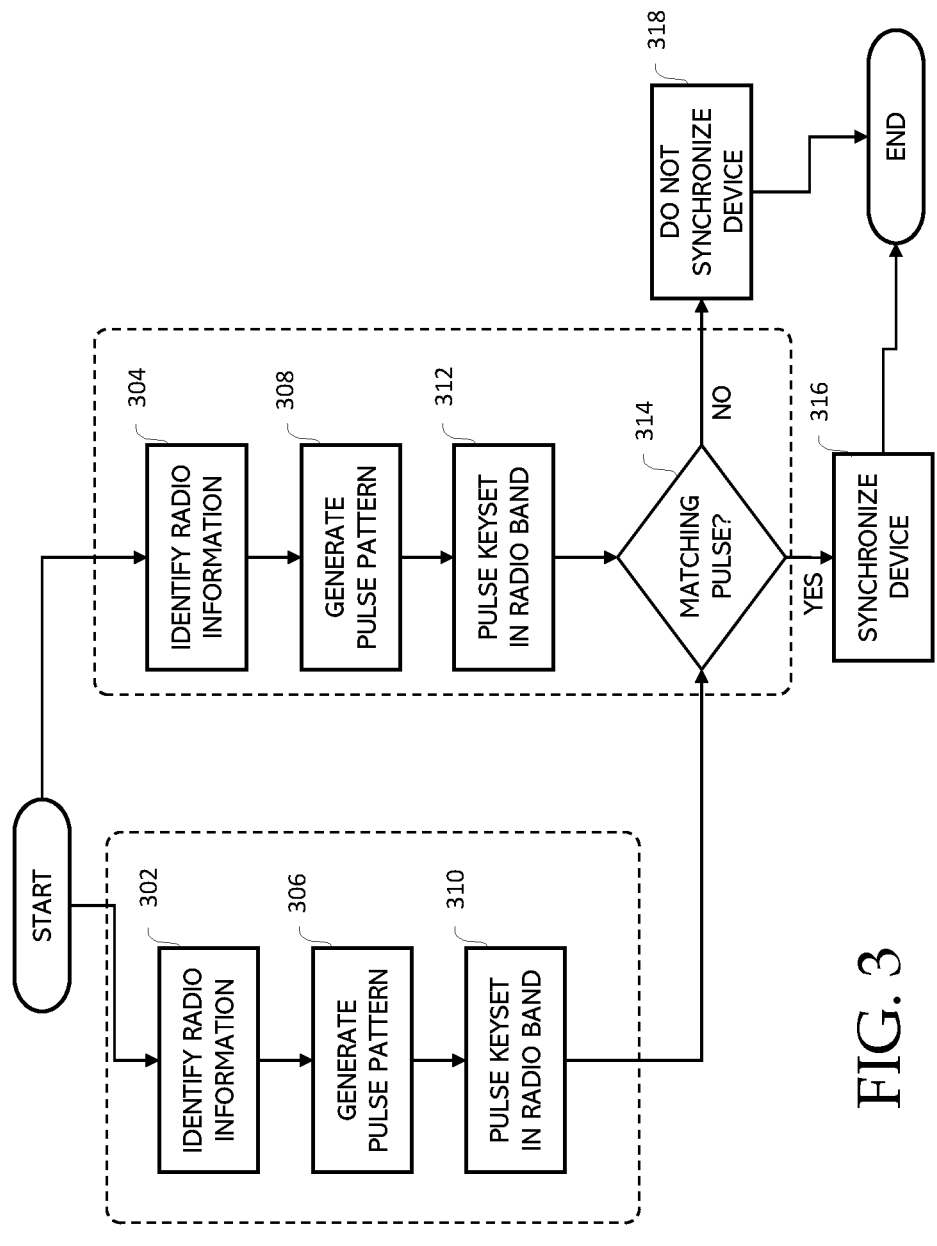
FIG. 3 is a flow diagram illustrating a method for synchronizing a device with an information handling system.

Turning to FIG. 3, a flow diagram 300 for a method for synchronizing information handling system 10 with mobile device 12 may begin at step 302 with mobile device 12 executing instructions to identify radio noise near mobile device 12 and at step 304 with information handling system 10 executing instructions to identify radio noise near information handling system 10. Mobile device 12 may identify radio noise associated with other information handling systems 10, mobile devices 12, peripheral devices (e.g., keyboards, mouse At step 306, mobile device 12 may generate a pulse pattern based on the radio noise identified by mobile device 12.

At step 308, information handling system 10 may generate a pulse pattern based on the radio noise identified by information handling system 10.

At step 310, mobile device 12 may pulse a keyset in a radio band.

At step 312, information handling system 10 pulse a keyset in a radio band.

At step 314, information handling system 10 may determine if a pulse keyset corresponds to mobile device 12 associated with an authorized user.

If the pulse keyset corresponds to mobile device 12 associated with an authorized user, information handling system 10 may, at step 316, synchronize with mobile device 12 for continued assurance that a person accessing information handling system 10 is an authorized user.

If the pulse keyset does not correspond to mobile device 12 associated with an authorized user, information handling system 10 may, at step 318, prevent synchronization with mobile device 12 to prevent access to information handling system 10 by an unauthorized user.

Without seeing the keyed pulses, based on similar environmental radio noise, the application on the PC will lock the device and require alternate security.

Alternately, if the applications are set up for a 'safe zone', access can be granted more simply when in a known location (ex: Wi-Fi access point by name, or MAC verification set up in a known secure location (ex: work/home)).

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

The invention claimed is:

1. A method for verifying co-location of an information handling system with a mobile device, the method comprising:

receiving, by an information handling system, a set of user credentials from a person;

collecting, by an information handling system, radio noise information associated with one or more radio noise sources associated with a first environment in which the information handling system is located, including:

collecting radio noise information associated with a first subset of the radio noise sources that are physically located within the first environment, and collecting radio noise information associated with a second subset of the radio noise sources associated with the first environment that i) are not physically located within the first environment and ii) are in radio communication with one or more of the first subset of the radio noise sources physically located within the first environment;

identifying, by the information handling system, a mobile device associated with an authorized user of the information handling system;

collecting, by the mobile device, radio noise information associated with one or more radio noise sources associated with a second environment in which the mobile device is located, including:

collecting radio noise information associated with a first subset of the radio noise sources that are physically located within the second environment, and collecting radio noise information associated with a second subset of the radio noise sources associated with the second environment that i) are not physically located within the second environment and ii) are in radio communication with one or more of the first subset of the radio noise sources physically located within the second environment;

determining the radio noise information associated with the one or more radio noise sources in the first environment matches the radio noise information associated with the one or more radio noise sources in the second environment;

determining the information handling system and the mobile device are co-located;

in response to determining that the information handling system and the mobile device are co-located, authorizing the person as an authorized user of the information handling system; and after verifying the person as an authorized user of the information handling system, synchronizing the mobile device with the information handling system to maintain authorization of the person as the authorized user of the information handling system, including continually synchronizing radio noise information between the mobile device and the information handling system.

2. The method of claim 1, wherein determining the radio noise information associated with the one or more radio noise sources in the first environment matches the radio noise information associated with the one or more radio noise sources in the second environment comprises determining a number of radio noise sources associated with the first environment matches a number of radio noise sources associated with the second environment.

3. The method of claim 2, wherein determining the number of radio noise sources associated with the first environment matches the number of radio noise sources associated with the second environment comprises determining a number of radio noise sources associated with the first environment communicating according to a cellular frequency matches a number of radio noise sources associated with the second environment communicating according to the cellular frequency.

4. The method of claim 2, wherein determining the number of radio noise sources associated with the first environment matches the number of radio noise sources associated with the second environment comprises determining a number of radio noise sources associated with the first environment communicating according to a Wi-Fi frequency matches a number of radio noise sources associated with the second environment communicating according to the Wi-Fi frequency.

5. The method of claim 2, wherein determining the number of radio noise sources associated with the first environment matches the number of radio noise sources associated with the second environment comprises determining a number of radio noise sources associated with the first environment communicating according to a Bluetooth frequency matches a number of radio noise sources associated with the second environment communicating according to the Bluetooth frequency.

6. The method of claim 2, wherein determining the radio noise information associated with the first environment matches the radio noise information associated with the second environment comprises determining a signal strength associated with a radio noise source of the one or more radio noise sources in the first environment matches a signal strength associated with a radio noise source of the one or more radio noise sources in the second environment.

7. The method of claim 1, further comprising:
    generating, by each of the information handling system and the mobile device, a pulse pattern based on the radio noise information;
    emitting, by the mobile device, the pulse pattern;
    detecting, by the information handling system, the pulse pattern;
    determining if the pulse pattern received from the mobile device matches the pulse pattern generated by the information handling system, wherein:
    if the pulse pattern received from the mobile device matches the pulse pattern generated by the information handling system, allowing the authorized user to continue accessing the information handling system; or
    if the pulse pattern received from the mobile device does not match the pulse pattern generated by the information handling system:
    determining the mobile device is not co-located with the information handling system; and
    preventing access to the information handling system.

8. A method for verifying a person attempting to access an information handling system is an authorized user, the method comprising:
    storing, in memory in the information handling system, a set of user credentials for an authorized user;
    executing, by the information handling system, an application stored in the memory for collecting radio noise information associated with one or more radio noise sources associated with a first environment in which the information handling system is located, including:
        collecting radio noise information associated with a first subset of the radio noise sources that are physically located within the first environment, and
        collecting radio noise information associated with a second subset of the radio noise sources associated with the first environment that i) are not physically located within the first environment and ii) are in radio communication with one or more of the first subset of the radio noise sources physically located within the first environment;
    identifying a mobile device associated with the authorized user;
    executing, by the mobile device associated with the authorized user, an application stored in memory in the mobile device for collecting radio noise information associated with one or more radio noise sources associated with a second environment in which the mobile device is located, including:
        collecting radio noise information associated with a first subset of the radio noise sources that are physically located within the second environment, and
        collecting radio noise information associated with a second subset of the radio noise sources associated with the second environment that i) are not physically located within the second environment and ii) are in radio communication with one or more of the first subset of the radio noise sources physically located within the second environment;
    determining if the radio noise information associated with the first environment matches the radio noise information collected from the second environment, wherein:
    if the radio noise information associated with the first environment matches the radio noise information associated with the second environment:
    determining the person attempting to access the information handling system is the authorized user; and
    allowing the authorized user to access the information handling system;
    after determining that the person attempting to access the information handling system is the authorized user, synchronizing the mobile device with the information handling system to maintain authorization of the person as the authorized user of the information handling system, including continually synchronizing radio noise information between the mobile device and the information handling system; and
    if the radio noise information associated with the first environment does not match the radio noise information associated with the second environment, performing one or more of:
    locking the information handling system; and
    notifying the person that one or more additional steps must be completed to access the information handling system.

9. The method of claim 8, wherein determining if the radio noise information associated with the one or more radio noise sources in the first environment matches the radio noise information associated with the one or more radio noise sources in the second environment comprises determining if a number of radio noise sources associated with the first environment matches a number of radio noise sources associated with the second environment.

10. The method of claim 8, wherein determining if the number of radio noise sources associated with the first environment matches the number of radio noise sources associated with the second environment comprises determining if a number of radio noise sources associated with the first environment communicating according to a cellular frequency matches a number of radio noise sources associated with the second environment communicating according to the cellular frequency.

11. The method of claim 8, wherein determining the number of radio noise sources associated with the first environment matches the number of radio noise sources associated with the second environment comprises determining a number of radio noise sources associated with the first environment communicating according to a Wi-Fi frequency matches a number of radio noise sources associated with the second environment communicating according to the Wi-Fi frequency.

12. The method of claim 8, wherein determining the number of radio noise sources associated with the first environment matches the number of radio noise sources associated with the second environment comprises determining a number of radio noise sources associated with the first environment communicating according to a Bluetooth frequency matches a number of radio noise sources associated with the second environment communicating according to the Bluetooth frequency.

13. The method of claim 8, wherein determining the radio noise information associated with the first environment matches the radio noise information associated with the second environment comprises determining a signal strength associated with a radio noise source of the one or more radio noise sources in the first environment matches a signal strength associated with a radio noise source of the one or more radio noise sources in the second environment.

14. The method of claim 8, further comprising:

generating, by each of the information handling system and the mobile device, a pulse pattern based on the radio noise information;

transmitting, by the mobile device, a keyset based on the pulse pattern;

detecting, by the information handling system, the keyset;

determining if the keyset received from the mobile device matches the pulse pattern generated by the information handling system, wherein:

if the keyset received from the mobile device matches the pulse pattern generated by the information handling system, allowing the authorized user to continue accessing the information handling system; or if the keyset received from the mobile device does not match the pulse pattern generated by the information handling system:

determining the mobile device is not co-located with the information handling system; and preventing access to the information handling system.

* * * * *